United States Patent
Argetsinger et al.

(10) Patent No.: US 7,681,383 B2
(45) Date of Patent: Mar. 23, 2010

(54) DUAL RESEARCH PLOT HARVESTER WITH UNCONVENTIONAL GRAIN FLOW

(75) Inventors: Mike J Argetsinger, Ankeny, IA (US); John M Gass, Slater, IA (US); Terry Henning, Maxwell, IA (US); Dan Larson, Ankeny, IA (US); Brian W Meier, Ogden, IA (US); Kevin W Meier, Ogden, IA (US); Alan B Meiners, Dedham, IA (US)

(73) Assignee: Syngenta Participations, AG., Basel (CH)

( * ) Notice: Subject to any disclaimer, the term of this patent is extended or adjusted under 35 U.S.C. 154(b) by 695 days.

(21) Appl. No.: 11/216,825

(22) Filed: Aug. 31, 2005

(65) Prior Publication Data

US 2006/0046801 A1  Mar. 2, 2006

Related U.S. Application Data

(60) Provisional application No. 60/605,977, filed on Aug. 31, 2004.

(51) Int. Cl.
*A01D 34/00* (2006.01)

(52) U.S. Cl. ........................................ 56/14.6

(58) Field of Classification Search ............ 460/6, 460/7, 119; 56/10.2 R, 10.2 B, 14.6, 1; 702/129; 701/34; 324/670, 452
See application file for complete search history.

(56) References Cited

U.S. PATENT DOCUMENTS

| | | | | |
|---|---|---|---|---|
| 3,760,267 A | * | 9/1973 | Williams | 324/670 |
| 4,376,298 A | * | 3/1983 | Sokol et al. | 701/34 |
| 4,403,191 A | * | 9/1983 | Satake | 324/452 |
| 5,173,079 A | * | 12/1992 | Gerrish | 460/7 |
| 5,318,475 A | * | 6/1994 | Schrock et al. | 460/1 |
| 5,327,708 A | * | 7/1994 | Gerrish | 56/1 |
| 5,487,702 A | * | 1/1996 | Campbell et al. | 460/7 |
| 5,518,454 A | | 5/1996 | Twilley | |
| 5,664,402 A | * | 9/1997 | Sandvik et al. | 53/384.1 |
| 5,863,247 A | * | 1/1999 | Behnke et al. | 460/6 |
| 5,890,961 A | * | 4/1999 | Behnke et al. | 460/6 |
| 5,957,773 A | * | 9/1999 | Olmsted et al. | 460/7 |
| 6,848,243 B2 | * | 2/2005 | Carr et al. | 56/10.2 R |
| 7,073,314 B2 | * | 7/2006 | Beck et al. | 56/10.2 B |
| 7,318,310 B2 | * | 1/2008 | Kincaid | 56/14.6 |
| 7,343,262 B2 | * | 3/2008 | Baumgarten et al. | 702/129 |
| 2007/0186530 A1 | * | 8/2007 | Meier et al. | 56/14.6 |

* cited by examiner

*Primary Examiner*—Árpád Fábián-Kovács
(74) *Attorney, Agent, or Firm*—Dana Rewoldt

(57) ABSTRACT

The invention relates generally to harvesters and, more particularly, to a combine for harvesting rows crops, which has been modified, to collect and measure grain from two separate small strip test plots. The present invention is a dual plot combine with two separate and distinct internal sections of the combine. The combine's intake has two floatably mounted feeder house. This invention harvests two lots simultaneously while maintaining the integrity of each plots' harvest data. The dual plot combine has two separate unconventional grain paths for collecting and measuring the cleaned grain drums The divided clean grain bin and weigh bucket are positioned at a low position, inside the vertical confines of the combine, on a single side of the combine. The altered grain paths allow the data collection on the clean grain from each plot to be completed quickly. This in turn allows the combine to progress to the next set of two plots quickly.

9 Claims, 16 Drawing Sheets

DUAL RESEARCH PLOT HARVESTER WITH UNCONVENTIONAL GRAIN FLOW

This application claims the priority from U.S. provisional application, 60/605,977 having a file date of Aug. 31, 2004.

BACKGROUND OF THE INVENTION

The invention relates generally to harvesters and, more particularly, to a combine for harvesting row crops, which has been modified, to collect and measure grain from two separate small strip test plots.

It is common in the seed industry to grow and collect data on a large number of test varieties to evaluate the individual varieties for possible advancement toward commercialization. Frequently, each variety being evaluated is grown at a plurality of locations to collect data under a range of growing conditions. Among data collected from these small plots are the weight of the grain harvested and the moisture of the grain at harvest. Each strip test plot typically consists of one or several rows of a length of approximately 20 feet.

It is known in the prior art to modify conventional harvesters by the addition of a weigh bucket which receives and weighs the grain collected off of each strip test plot, and measures the moisture of a sample of the collected grain, and then discharges the grain into a bulk reservoir where it is commingled with grain harvested off of other strip test plots. The weight moisture data collected is typically stored in a local memory device for subsequent processing.

The process of measuring and collecting grain begins with the advancement of the harvester through the strip test plot, and then stopping the harvester at the end of the strip test plot, measuring the collected grain and then beginning advancement into the adjacent strip test plot. The ground travel of the harvester is stopped while the threshing and cleaning action of the harvester is continued in order to process the entire quantity of grain collected through the harvester for delivery to the weigh bucket. After all of the grain collected off of the specific strip test plot has been processed and delivered to the weigh bucket, the harvester can then be advanced into the next strip test plot. The dwell time between strip test plots is, accordingly, a function of how quickly the collected grain is threshed and cleaned by the harvester and conveyed to the weigh bucket.

Most harvesters have the clean grain tank positioned at the top of the harvester. It is common to position the weigh bucket above the clean grain reservoir so that the weigh bucket will discharge directly into the reservoir after the grain has been measured. This positioning of the weigh bucket increases substantially the already tall height of the harvester with the result that the weigh bucket must be moved from its operative position or totally removed to permit the harvester to comply with federal regulations for travel on the highway and to pass through the door of machine sheds or other equipment shelters.

The prior art also includes harvesters that have the capacity to collect grain from two separate strip tests through the use of a dual harvester, e.g. a harvester that is divided into halves. This harvester reduces the time to complete strip plots as two strips are done at once. However, since this harvester has the clean grain tank positioned at the top of the harvester. This requires that the weigh buckets be positioned above the clean grain reservoir so that the weigh buckets will discharge directly into the reservoir after the grain has been measured.

Additionally, the prior art includes U.S. Pat. No. 5,518,454, which shows a harvester with unconventional grain flow for collecting and measuring grain grown on strip test plots. The conventional harvester places a weigh bucket for measuring grain at the grain storage location. The '454 modifies the placement of the single weigh bucket by reversing the grain flow of a lateral conveyor and locating the weigh bucket at a low position inside the vertical confines of the harvester. Thus reducing the time required to move harvested grain to the weigh bucket and the waiting time required between harvesting of successive strip plot test, and decreasing the height of the harvester.

This harvester saves time in speeding the weighing step but does not allow for more then one strip plot to be processed at a time.

SUMMARY OF THE INVENTION

The invention consists of a grain harvester with an unconventional grain flow as taught in U.S. Pat. No. 5,518,454 with a single weigh bucket for single plot harvesting, with the improvement being that the harvester is split to include not one, but two weigh buckets located approximate one another on the same side of the dual combine. Thus the improved harvester has been modified to have two complete and separate grain collecting halves each half adapted to harvest grain off of a strip test plot, weigh the grain collected, measure the moisture content of the sample of the grain collected, and record the information for subsequent processing with weigh buckets mounted to the harvester at a position inside the vertical confines of the harvester. The grain path of the harvester is altered to direct the two components of clean grain into the weigh buckets at a point early in the path of clean grain from the threshing operations of the harvester. Data collected by each weigh bucket is sent to a small computer positioned in the operator cab of the harvester while the sensor and weigh bucket control electronics for each is located near the weigh bucket to reduce the amount of wiring required, thereby easing installation effort and reducing cost. By reducing the length of small-signal bearing wire, the problem of electrical interference is reduced and the potential for damage to the wiring is decreased.

In this particular application, the conventional harvester has a chassis or main frame having four ground-engaging wheels. Supported on the main frame are an operator's cab, a head portion having a left head side and a right head side which are partially divided, a divided feeding assembly, left and right feeding assembly to accept material from the respective head side, a divided threshing, and divided separating assembly, a divided grain cleaning assembly with sieves, two separate lateral conveyors that move each respective right side or left side grain portion to the left side of the combine (as seen from the rear of the combine) into two separate short vertical conveyor proximate one another which transport the grain upwardly into a divided grain bin, two weigh buckets and a grain tank and a power plant or engine. A second lateral grain conveyor then moves all clean grain from the weigh buckets discharge to the right side of the harvester (as seen from the rear of the combine). The grain is then fed into short connecting conveyor to a second vertical conveyor, which transports the clean grain to the clean grain tank.

An object of the invention is to provide a harvester for collecting and measuring grain from strip test plots which substantially reduces the amount of time required to collect and measure grain from each of two strip test plots.

Another object of the invention is to provide a strip test plot harvester wherein the weigh buckets are positioned within the vertical and transverse confines of the harvester.

A further object of the invention is to provided a strip test plot harvester wherein the sensor and control electronics of the grain measuring apparatus are located near the grain measuring apparatus whereas means for recording collected data is located in the operator's cab These and other objects of the invention will be understood by a person of skill in the art upon a review of the specification, associated drawings, and appended claims.

BRIEF DESCRIPTION OF THE DRAWINGS

FIGS. 6A and 6B are perspective views of a sample bucket positioned inside the weigh bucket wherein FIG. 6A shows the condition immediately after grain has been discharged into the weigh bucket and FIG. 6B shows the condition after the grain the sample bucket has been leveled.

DETAILED DESCRIPTION OF A PREFERRED EMBODIMENT

Figure 1:
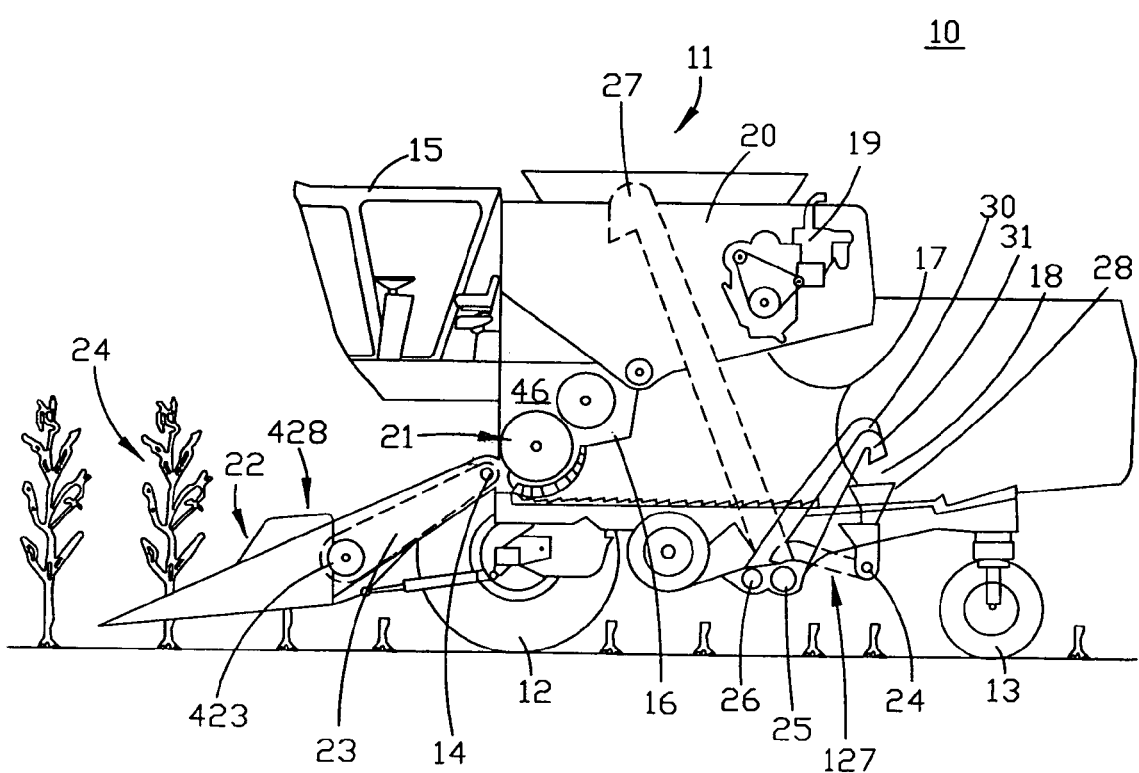
FIG. 1 is a left side view of a harvester of the present invention.

Referring to FIG. 1 there is illustrated, a row crop combine harvester which incorporates the present invention. The harvester 10 in the preferred embodiment is a John Deere model 3300, although the teachings of the invention can be applied to other harvesters as well. The harvester 10 in the preferred embodiment includes a corn head 22 for the harvesting of corn grown in rows. The corn head 22 of the preferred embodiment accommodates the simultaneous harvesting of grain from four rows. Alternatively, if the crop to be harvested were, for example, soybeans, a bean head (not shown) of the usual construction with divider would be attached to the harvester 10 in place of the corn head 22.

Briefly, the harvester 10 is placed into operation and advanced into the rows of crop to be harvested. In the case of corn, the corn head separates the ears of corn from the stalks. Corn ears move to a shelling or threshing operation where the kernels of corn are separated from the cob. Chaff and other debris are then separated from the corn kernels, the kernels then referred to as clean grain.

In the case of corn, strip test plots consist of one or more parallel rows of an individual variety being studied. The strip test plots are small, with rows typically on the order of 20 feet in length. The strip test plots are planted so that a gap of approximately 3 feet is created between successive strip test plots. In the past at harvest time, a prior art combine harvester was used to collect and measure the grain produced on each of the individual strip test plots. A prior art John Deere Model 3300 harvester adapted to collect and measure grain from strip test plots would transport the grain to the right side of the harvester (as seen from the rear). The clean grain would then be transported upwardly by a vertical conveyor and discharged into a weigh bucket that was positioned above a clean grain reservoir or tank 20. The weigh buckets are available from Carter Manufacturing although the teachings of the invention can be applied to other weigh bucket as well.

The collecting and measuring process of each strip test plot begins by positioning the harvester at the beginning of the strip test plot to be harvested. The harvester is then advanced through the strip test plot and its ground travel is stopped when the entire strip test plot has been harvested but before the grain growing on the succeeding strip test plot is harvested. The harvester is held stationary while the grain is husked, shelled, and cleaned, and conveyed into the weigh bucket. When the entire volume of grain collected off of the strip test plot is in the weigh bucket the grain is weighed and a sample is tested for its moisture content. This data is typically stored in an electronic memory device in an operator's cab of the harvester. After the operator of the harvester has determined that all of the grain from the first strip test plot has been conveyed to the weigh bucket, the harvester is then advanced into the succeeding strip test plot. The dwell time required between successive strip test plots is determined by the speed of the harvester in processing the grain and transporting the cleaned grain to the weigh bucket. Specifically, for a John Deere Model 3300 incorporating the prior art technique, the dwell time is between about 10 and about 20 seconds.

In the prior art invention by Twilley, the clean grain path of the harvester was substantially modified and a single weigh bucket was moved from above the clean grain tank to a low position inside the vertical confines of the harvester. The clean grain was deposited in a lateral conveyor that operated to produce grain flow in the opposite direction of a conventional harvester grain flow, to convey clean grain to the left-hand side of the harvester (as seen from the rear of the harvester). The clean grain was then transferred upwardly by a left vertical conveyor for weighing and moisture measurement. After the measurements were completed, the grain was discharged into a second lateral conveyor, which transported the grain to the right side of the harvester (as seen from the rear) where it was moved upwardly by a right vertical conveyor into the clean grain tank.

The clean grain path in the Twilley harvester had been shortened substantially over the clean grain path of the previous prior art harvester. Accordingly, the dwell time between successive strip test plots had been reduced to between about 5 and about 10 seconds when using Twilley's invention. Additionally, by moving the weigh bucket from a high position above the clean grain tank to a low position within the vertical confines of the harvester, the overall height of the harvester was reduced to its original factory height such that the harvester could be legally transported without requiring removal or displacement of the weigh bucket.

The present invention uses the reverse grain flow path of the Twilley invention. However, the present invention introduces a harvester that allows more than one individual variety in a strip plot to be harvested at the same time. The Twilley prior art reduced the wait time between plots and reduced the height of the harvester. The present invention surprisingly maintains the reduced height of the harvester and maintains the reduced wait time between plots while permitting the operator to harvest two separate individual varieties at the same time. The harvester gathers separate data results for each individual variety. Thus results for two individual varieties can be gathered in the same time it used to take the Twilley harvester to analyze one variety.

The terms "grain" and "straw" are used principally throughout this specification for convenience and it is to be understood that these terms are not intended to be limiting. Thus "grain" refers to that part of the crop material, which is threshed and separated, from the discardable part of the crop material which is referred to as "straw". Also the terms "forward", "rearward", "left" and "right", when used in connection with the combine harvester and/or components thereof are determined with reference to the direction of forward operative travel of the combine harvester, but again, these terms should not be construed as limiting. The terms "longitudinal" and "transverse" are determined with reference to the fore-and-aft direction of the harvester and are equally not to be construed as limiting.

The harvester 10 shown in FIG. 1 of the accompanying drawings is of the present invention and is an improvement on U.S. Pat. No. 5,518,454, the Twilley patent, which is incorporated in its entirety by reference. The present invention operates to pick or harvest the crop material and then funnel this crop/grain material into either a right section of the divided harvester or the left section of the divided harvester to be threshed and separated while it is advanced toward the rear of the combine. The divided (or dual) combine harvester comprises a chassis or main frame 11 having a pair of front wheels 12 and a pair of rear wheels 13. Supported on the main frame 11 are an operator's cab 15, a crop intake auger, a threshing assembly 21, and separating assembly 16, a grain cleaning assembly 17, two lateral conveyors 25, 26. Each moving grain from each of the respective divided sides to the left and one lateral conveyor 24 moving grain to the right, two grain bins 18, two weigh buckets 28, right side conveyor 127 interconnected to the long vertical conveyor 27, two short vertical conveyors 30, 31 a clean grain tank 20 and a power plant or engine 19. A corn head 22 and feeder house 23 extend forwardly of the main frame 11 and are pivotally secured thereto for generally vertical movement of crop material 2 toward crop intake auger (not shown) located in front of the feeder house 23, which is proximate the threshing assembly 21.

Figure 17:
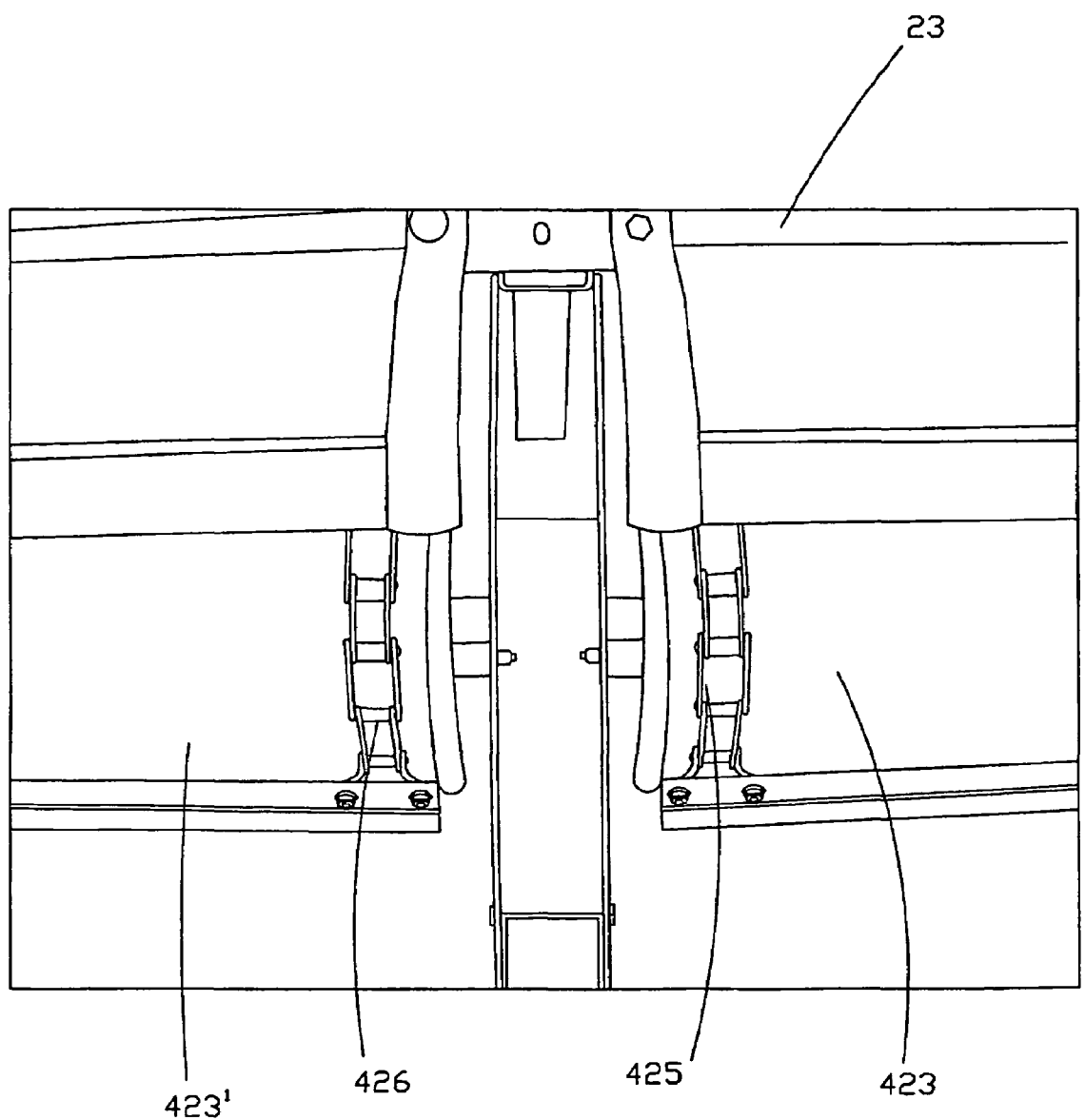
FIG. 17 is a front view of the two sections of the feeder house drum which form a division of the feeder housing into two components unlike prior art divided harvesters that do not divide the feeder house.

The machine has at its front end, a corn head 22 having a conveyor or stripper adapted to separate: ears from stalks of corn and convey this material into a crop intake auger. Unlike conventional harvesters for strip plots, this harvester with its associated corn head 22 are adapted to harvest, weigh, measure and produce data from two distinct plots of crop material. To accomplish this, the present invention is divided into two distinct portions of the grain processing assembly along an imaginary longitudinal line passing through the center of the harvester 10 from fore to aft. Along this line, a divided component is formed of two substantially equal sized, right and left portions of: the intake auger, feeder house 23, feeder house drum 423, threshing 21, separating 16 and cleaning assemblies 17. The intake auger is split in two within the corn head 22. The feeder house 23 holds a feeder drum 423 which in accordance with the present invention is divided into two feeder drum halves 423 and 423' as shown in FIG. 17. The drum was divided through the center to form two equal drum halves floatably mounted at 401. This split required that each half drum 423 and 423' have a right and left portion of a chain 425 and 426 respectively attached by a plate 427 and 429 respectively.

Figure 7:
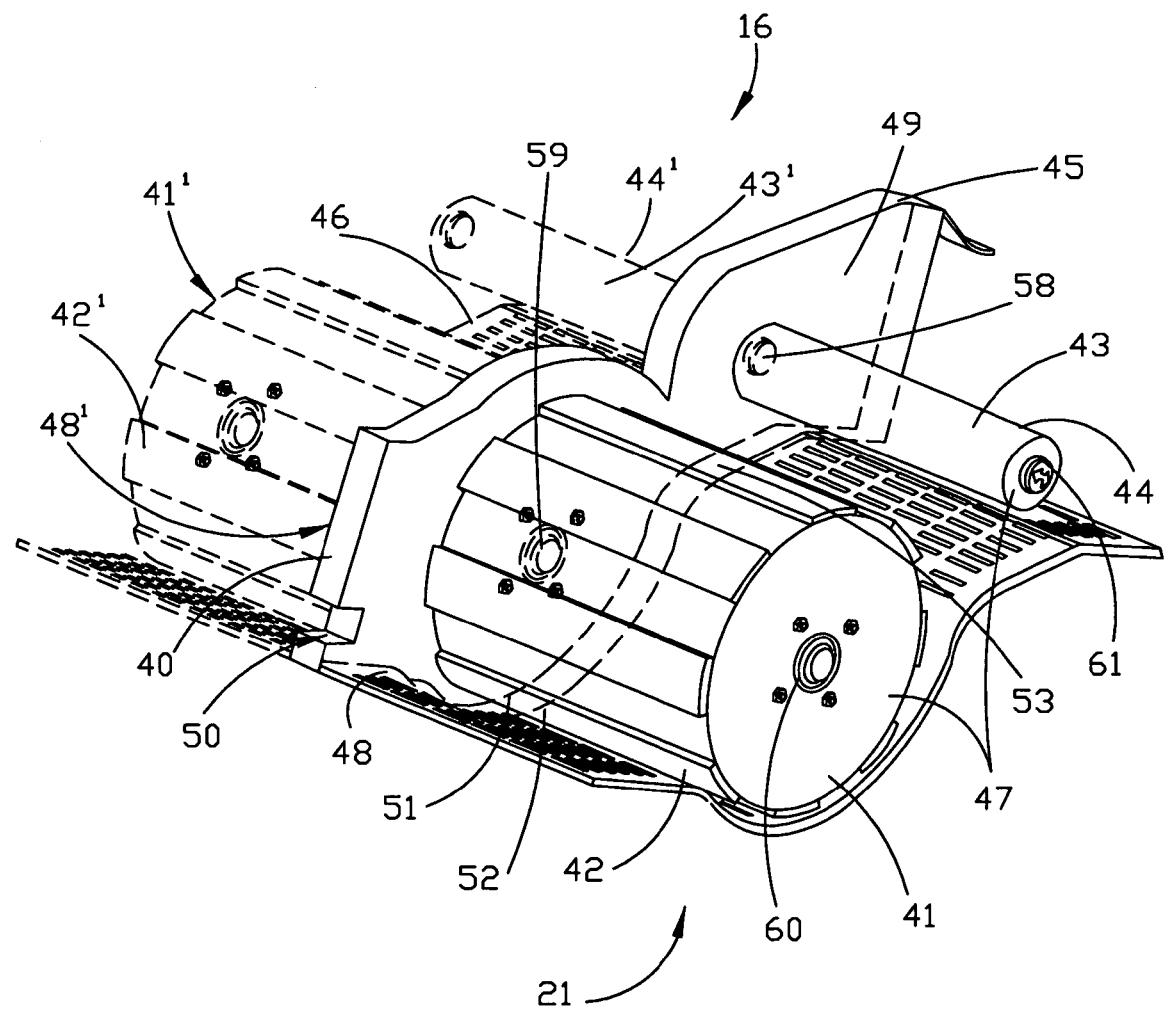
FIG. 7 is a perspective view of the threshing assembly and the separating assembly with the rotor dividing plate.
Figure 8:
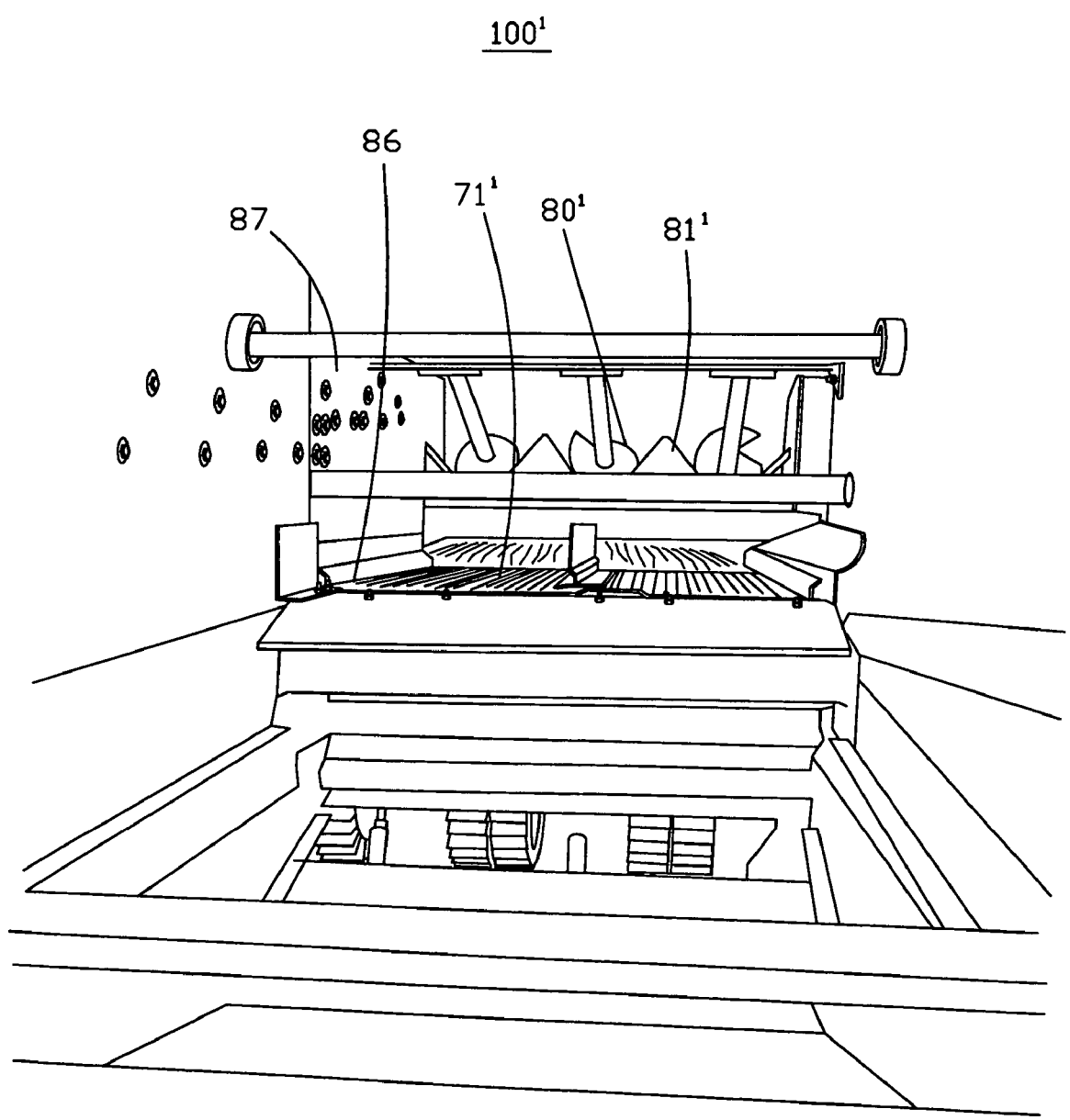
FIG. 8 is a rear perspective view of the cleaning assembly on the right side of the harvester when viewed from the aft portion of the harvester.
Figure 9:
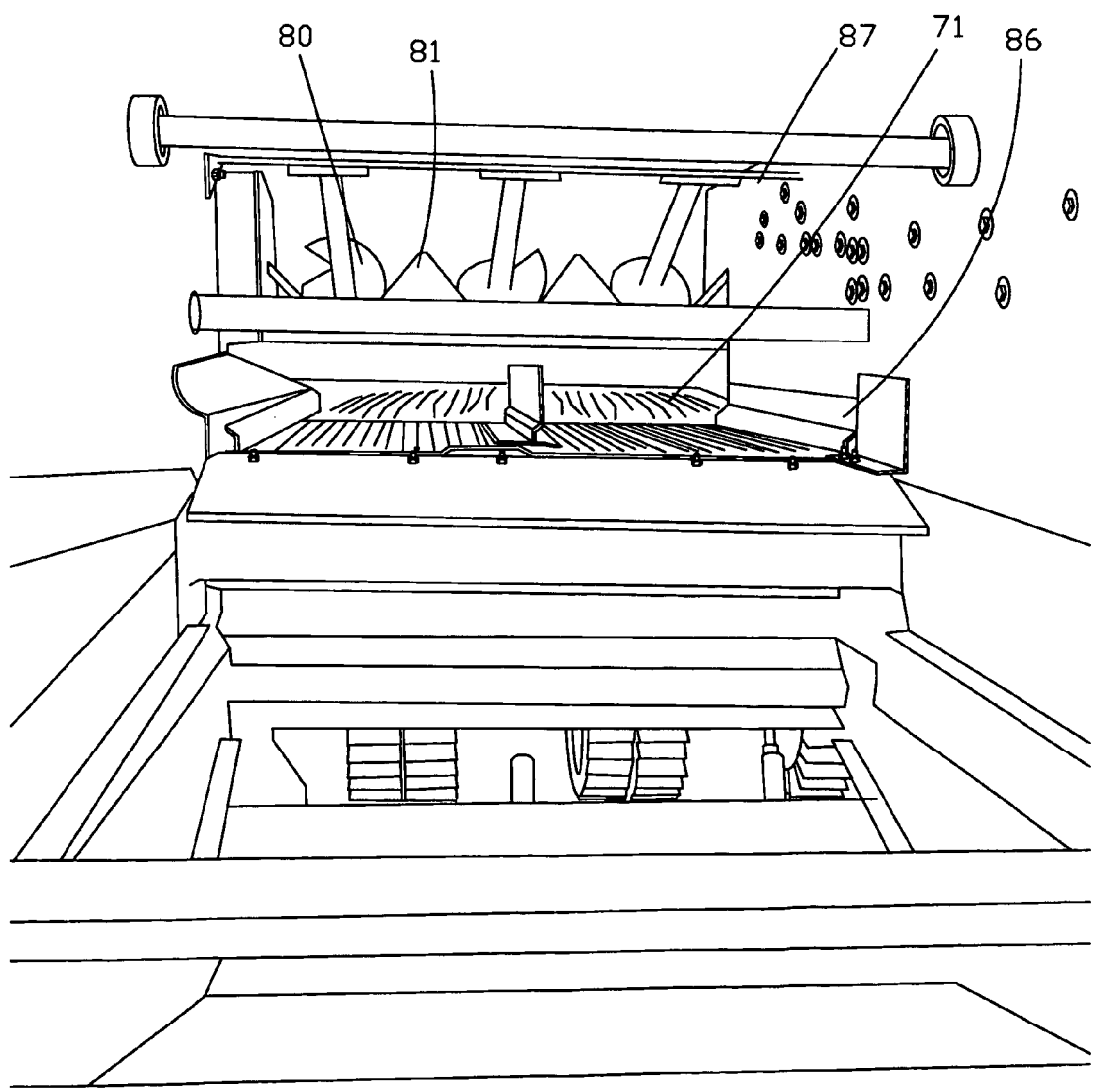
FIG. 9 is a rear perspective view of the cleaning assembly on the left side of the harvester when viewed from the aft portion of the harvester.
Figure 11:
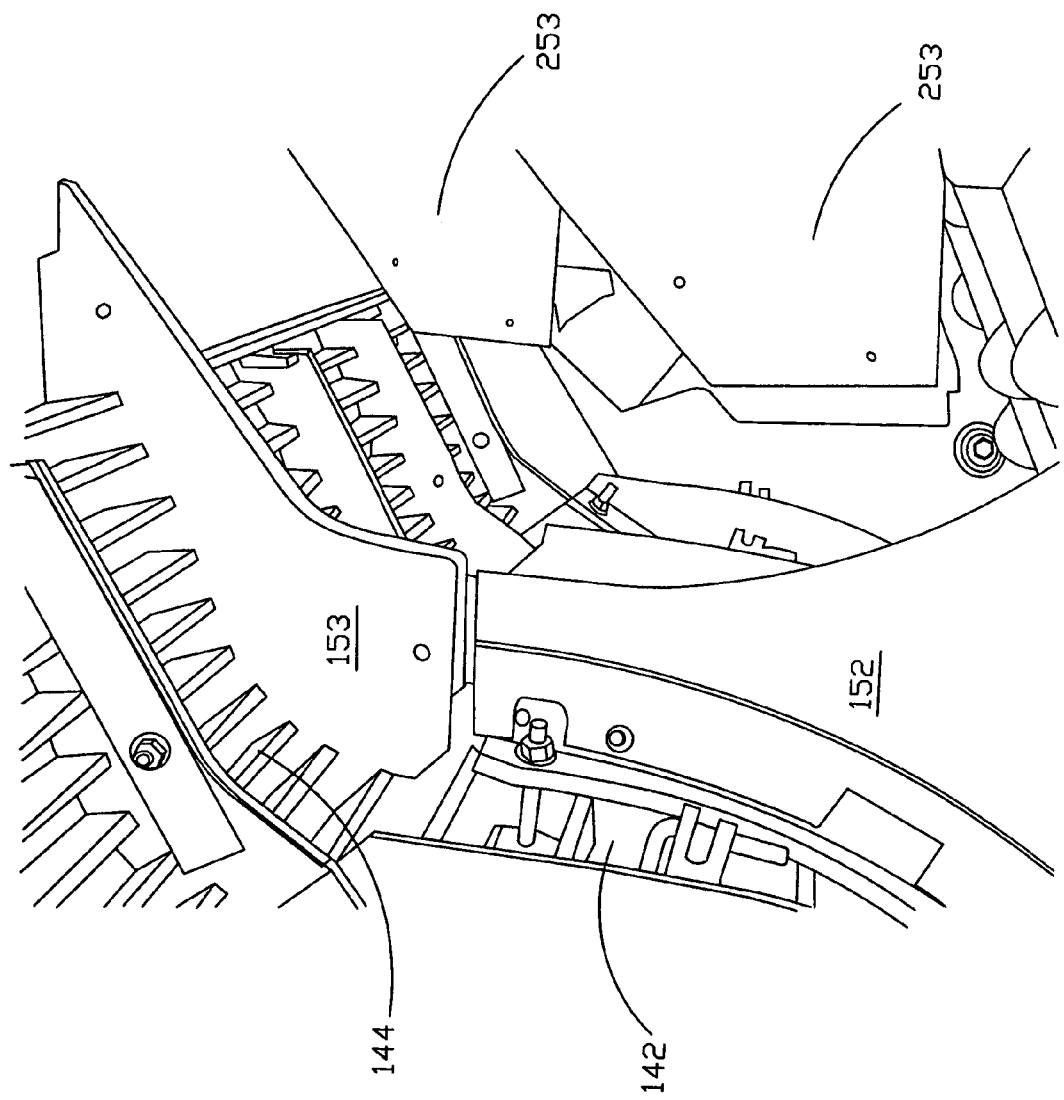
FIG. 11 a perspective view of the straw walkers, concave and beater grate.
Figure 12:
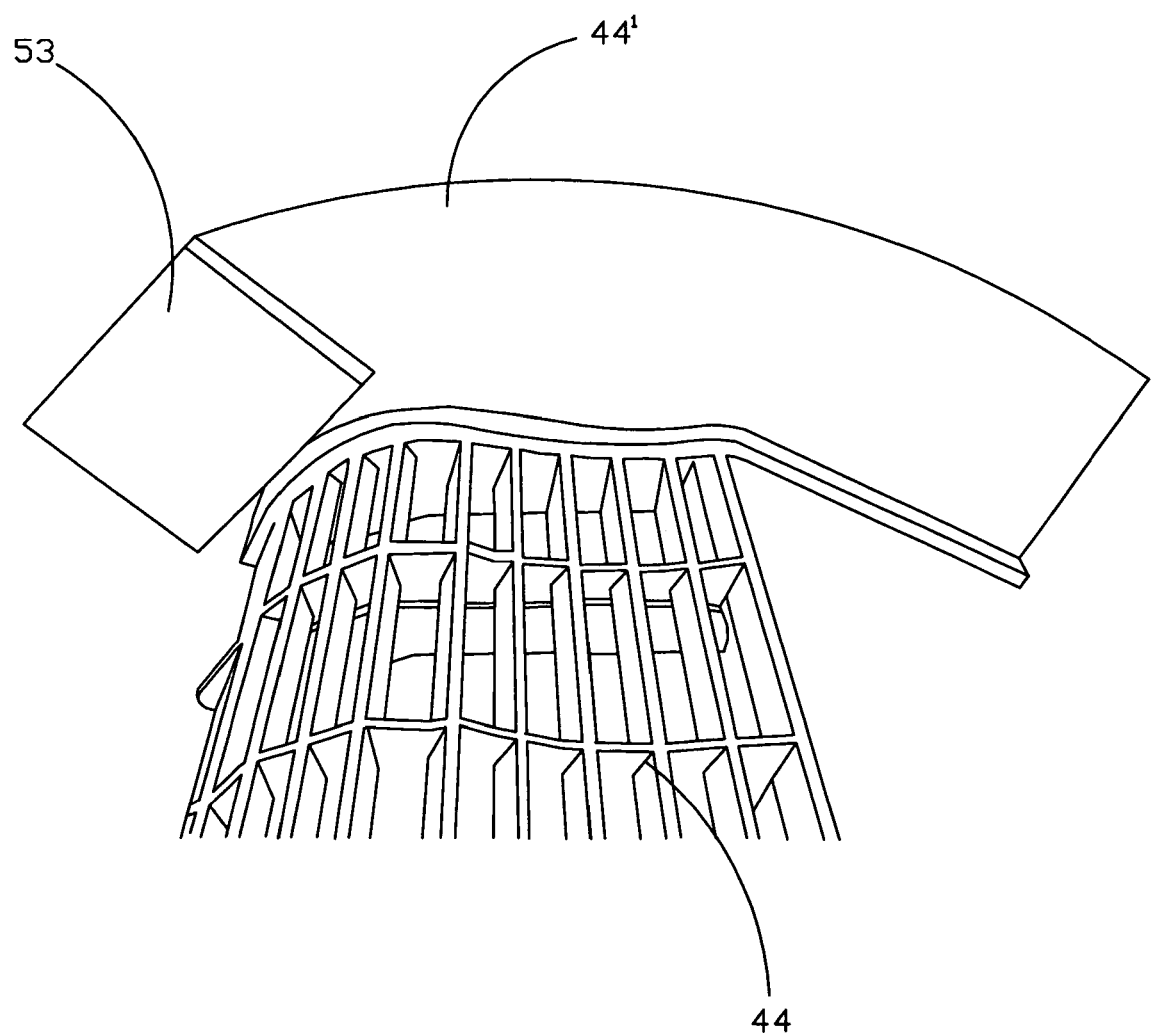
FIG. 12 is the top view of the beater grate and its grate dividing section.

Another portion of this divided component is shown in part in FIG. 11 and in part in FIG. 12. FIG. 7 shows the division into two compartments or chambers of the threshing 21 and separating 16 components. FIG. 8 and 9 show respectively the right and left side compartments of the cleaning assembly 17. The present invention is adapted to convey from the divided component, a left and a right, cleaned grain portion into respective lateral conveyors to be separately but simultaneously weighed and measured. Thereafter, the left and right portions of clean grain material are commingled as it is conveyed to the clean grain tank 20.

Once the crop/grain material is introduced into the corn head 22, the header dividing portion 428 is adapted to maintain a distinct right and left section of crop/grain material 2. The left and right crop/grain material 2 is conveyed by the corn head 22 or alternately a bean head into the intake auger. This intake is separated by an auger dividing plate which forms a left and right feeding auger section within the divided component. The flighting on each half of the auger are trimmed proximate the center of the auger shaft to allow for the dividing plate to be insert to divide the respective halves of the intake auger. The divided crop material 2 is maintained as separate discrete portions of crop/grain material 2 while being processed within the divided components of the harvester.

The left and right portions of the intake auger respectively move each respective right and left crop/grain material 2 into the respective, left and right, feeder house 23 into the two sections of feeder house drums 423', 423. Each feeder house drum is individually mounted to float and is not mounted as an unmoving block. This permits free flow of crop material 2 into the threshing 21 and separating 16 assemblies of the divided component. The adjustability of the feeder drums provide their ability to separately float up and down in a vertical direction and decreases delay due to crop material clogging up the feeder house.

The threshing and separating assemblies comprise a pair of generally juxtaposed open spaced chambers in which rotors identified as a threshing cylinder and a beater shaft are rotated to thresh and separate the crop received. That is to say, the crop/grain material 2 is rubbed and beaten between the rotors 47 and the inner surfaces of the chambers 46, whereby the grain, seed or the like, is loosened and separated from the straw. To maintain the left and right crop/grain material separate within the divided threshing and separating component of the harvester, the threshing cylinder 41 and 41', its associated concave 42 and 42', the beater shaft 43 and 43' and its associated beater grate 44 and 44' are compartmentalized by the rotor dividing plate 49.

More specifically, behind the divided intake auger and immediately behind the feeder house 23, the grain/crop material proceeds to the threshing cylinder 41 which rotates continuously about a horizontal axis running perpendicular to the longitudinal imagery plane running from fore to aft and top to bottom, splitting the harvester into two halves. The plane divides the intake threshing, separating and cleaning assemblies into two halves of equal size. The threshing cylinder 41 is juxtaposed with a threshing concave extending parallel to and below the rotor. Each respective concave 42, 42' have a first and second side. The first side is proximate to the threshing cylinder. The second side is opposite the first side and is a lower concave surface 142, 142' respectively. Cylinders 41, 41' respectively cooperate with concave 42, 42' each which partially wraps the respective cylinder 41, 41' to thresh the crop material. The cylinder 41 rotates at a given speed to reduce the ears to fragments including pieces of cob, corn kernels, and pieces of husk. Below the respective sections of the threshing cylinder 41 and 41' and the threshing concave 42 and 42', are augers 80 and 80', within auger shoes 81 and 81' adapted to move the respective sections of crop material toward the aft of the harvester.

Slightly above and behind the threshing cylinder 41 is the other rotor, the beater shaft. The beater shaft has two portions 43, 43' and each associated beater grate 44, 44'. The beater graters each have a first and second side. The first side is proximate the beater shaft. The second side is opposite the first side and is a lower surface. The lower surface of the beater grate 44 is lower grate surface 144.

This grater surface has a grate separation panel 153 and the lower concave surface 142, 142' (not shown) has a concave separation panel 152, both panels are adapted to engage with plastic to enclose the chamber into two separate sections which are adapted to avoid commingling of the crop material from each respective plot. The threshed straw is conveyed rearwardly within its respective left or right compartment toward the beater shaft assembly with its associated beater grates. The beater shaft (which has two distinct portions) in association with the beater grate (which has two distinct sections) delivers the lighter weight straw to the bank of straw walkers 253 (FIG. 11) and also serves to deflect heavier fragments cob, corn kernels, and pieces of husk down onto the cleaning assembly 17 which has a ridged sieved floor. The floor is adapted to be reciprocated horizontally with limited vertical movement in such a manner as to move the fragments within the sieved area.

Figure 13:
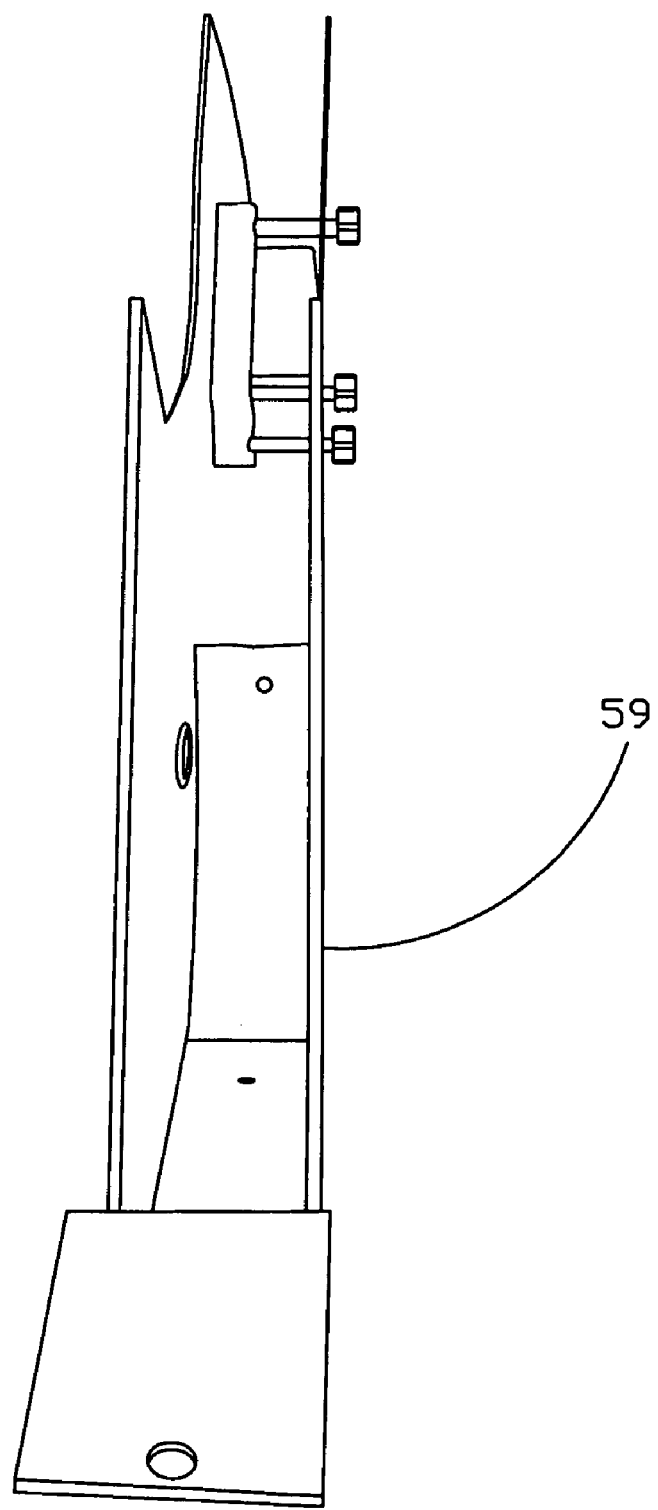
FIG. 13 is a front interior view of the rotor dividing plate.
Figure 14:
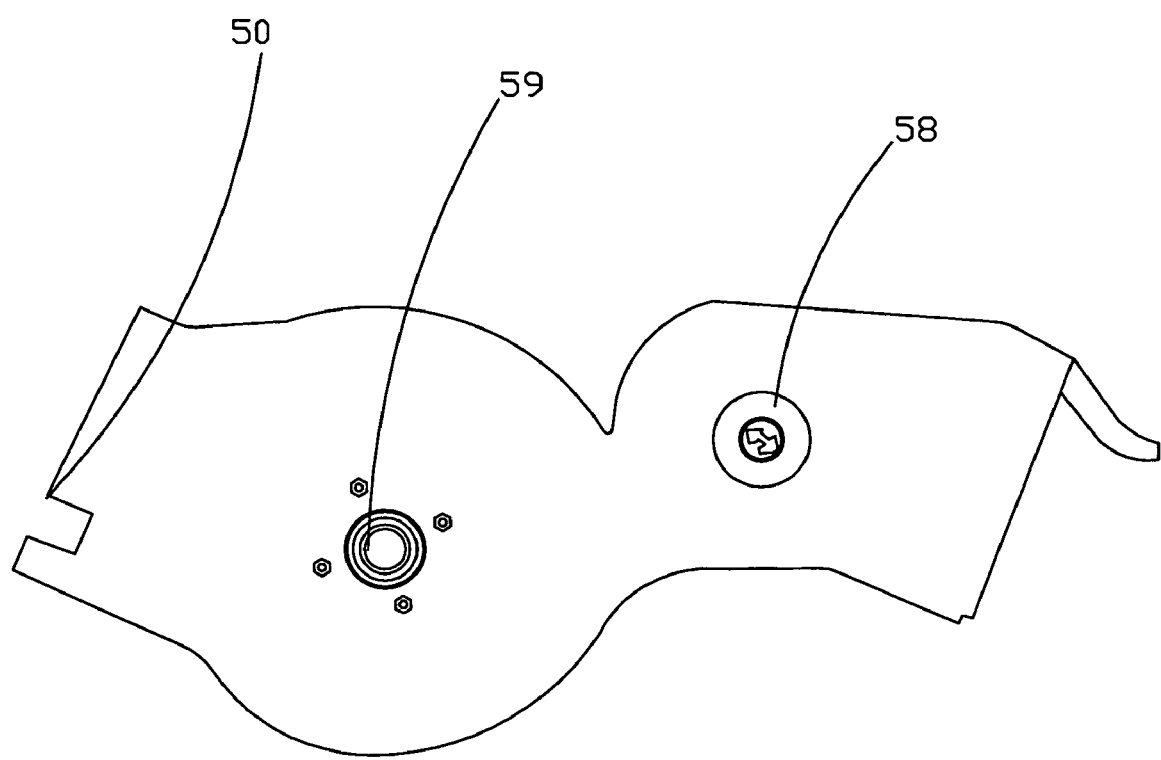
FIG. 14 is a side view of the rotor dividing plate.

To maintain the left and right crop/grain material separate within the divided component the threshing cylinder its associated concave, the beater shaft and its associated beater grate are compartmentalized by the rotor dividing plate. The rotor dividing plate 49 has two parallel sides 48 and 48' which are attached at the top by a narrow top wall 45 and open at bottom side walls 51 and 51'. The rotor dividing plate 49 has a front notch 50 adapted to receive the upper feeder housing shaft 14 thus forming a left and right side. The lower open bottom walls 51 and 51' are engaged with the concave divider 52 and beater grate divider 53 shown in FIG. 12 and FIG. 17. The first shaft opening 59 and the second shaft opening 58 shown in FIGS. 7, 13 and 14 and are adapted to accept the shafts 60 and 61 for the respective rotors 47. In a conventional harvester the threshing cylinder and the beater shaft are each formed as one continuous rotor mounted on a shaft.

Figure 15:
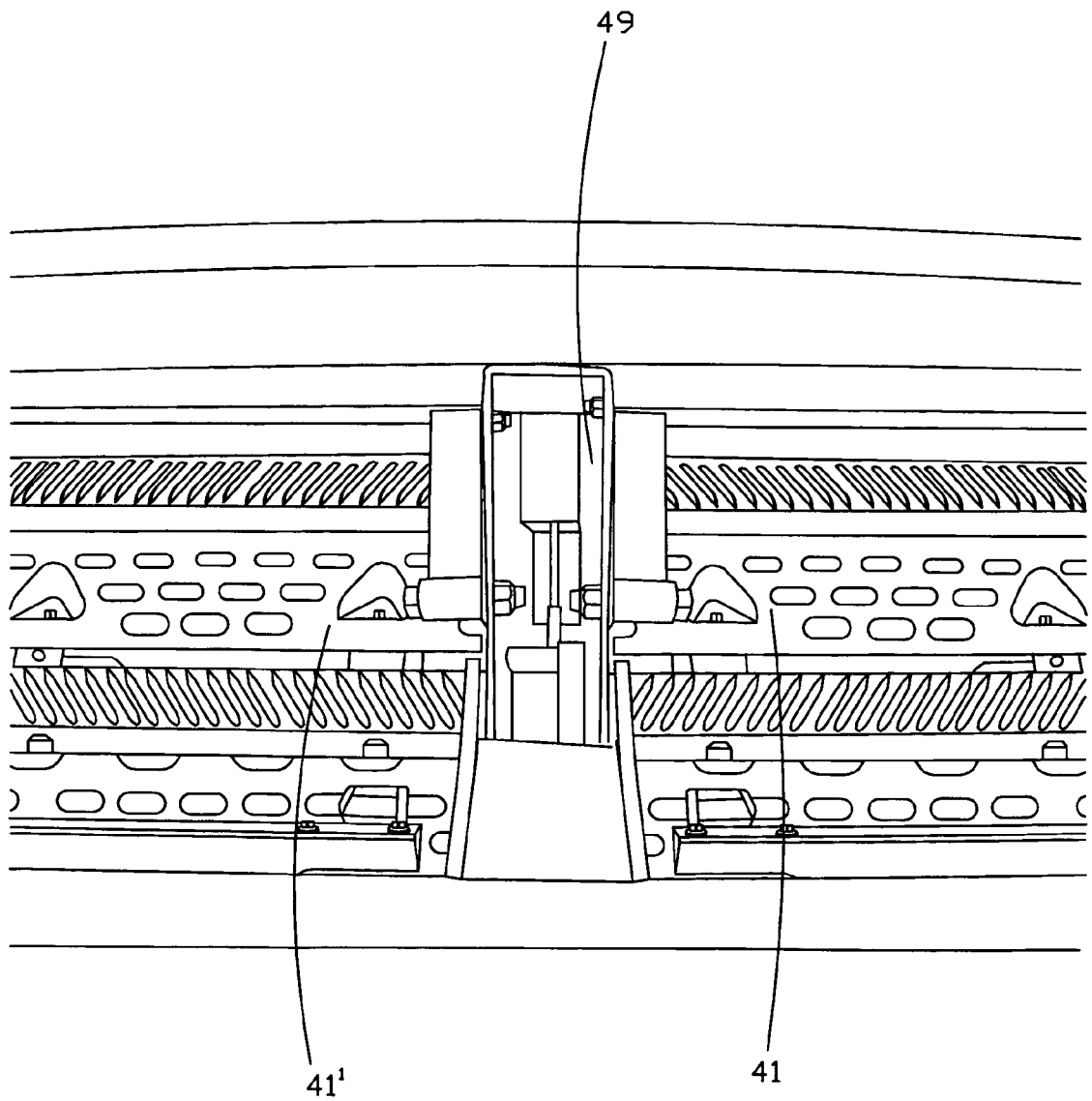
FIG. 15 is a front perspective view of the rotor dividing plate, the throat and the intake divider wedge.

The improvement of the present invention divides each of the rotors mounted on the shaft into two separate halves of the rotor 47. FIG. 15 shows the front view of the threshing cylinders 41 and 41' mounted on a shaft (not shown), which runs perpendicularly through the opening 59 of the side walls 48 and 48' of the rotor dividing plate 49. Likewise, slightly above and aft of the threshing cylinders 41 and 41' the rotor shaft 61 runs through opening 58 to support the two halves of the divided beater grate 44 and 44' (see FIG. 7).

Below the respective sections of the threshing cylinder 41, 41' and the threshing concave 42, 42', are augers, within auger shoes, in each of the respective right and left compartments, running from fore to aft of the harvester in the same direction as the rotor dividing plate 49. These augers are adapted to convey the loosened grain toward the cleaning assembly 17 of the divided component. Below the respective sections of the threshing cylinder 41, 41' and the threshing concave 42, 42', are augers 80, 80' shown in FIGS. 8 and 9, within auger shoes 81, 81', in each of the respective right 100 and left compartments 100'. These augers are adapted to convey the loosened grain toward the divided cleaning assembly 17 of the divided component.

Figure 10:
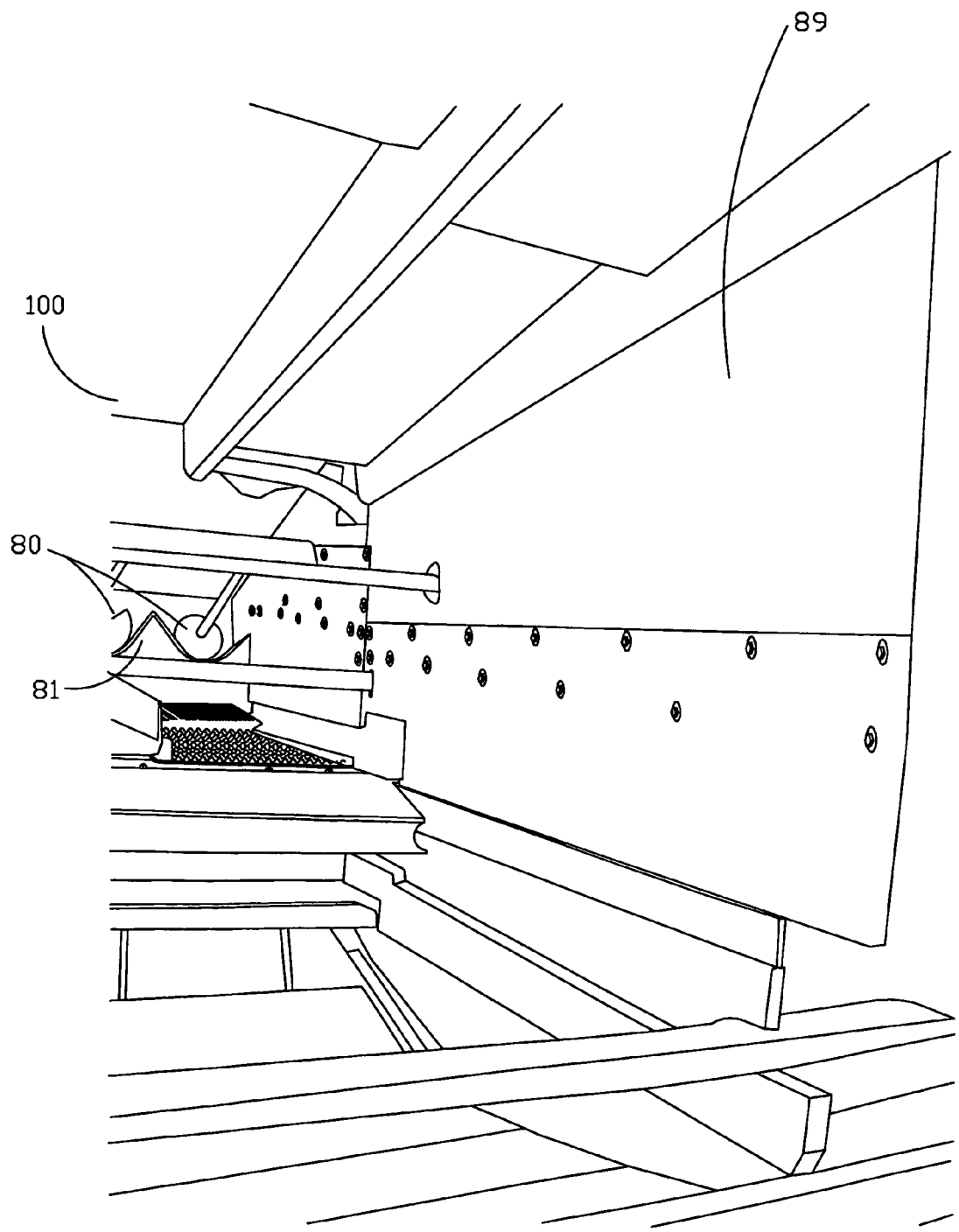
FIG. 10 is a rear perspective view, which shows the cleaning plate divider, which runs along the harvester's longitudinal axis and fore to aft through the cleaning assembly in the center of the harvester.

Grain which has been separated by the threshing 21 and separating 16 assembly falls onto a respective right 100' and left 100 compartments of a cleaning sieve 71 and 71' which is oscillated generally back-and-forth for transporting threshed and separated grain. The same oscillatory movement spreads grain across sieves 71 and 71' while permitting the passage by gravity of cleaned grain through the apertures of these sieves 71 and 71', and the passage of crop debris to the aft of the harvester. The cleaning assembly dividing plate 87 and confining edges 86 can be slidingly engaged with the cleaning assembly 17 while being securely engaged with the rotor dividing plate 47 at the fore section of the cleaning assembly 17 and with the chassis 11 across the top edge 89 (shown in FIG. 10) of cleaning assembly dividing plate 87 to form an enclosed chamber.

Figure 2:
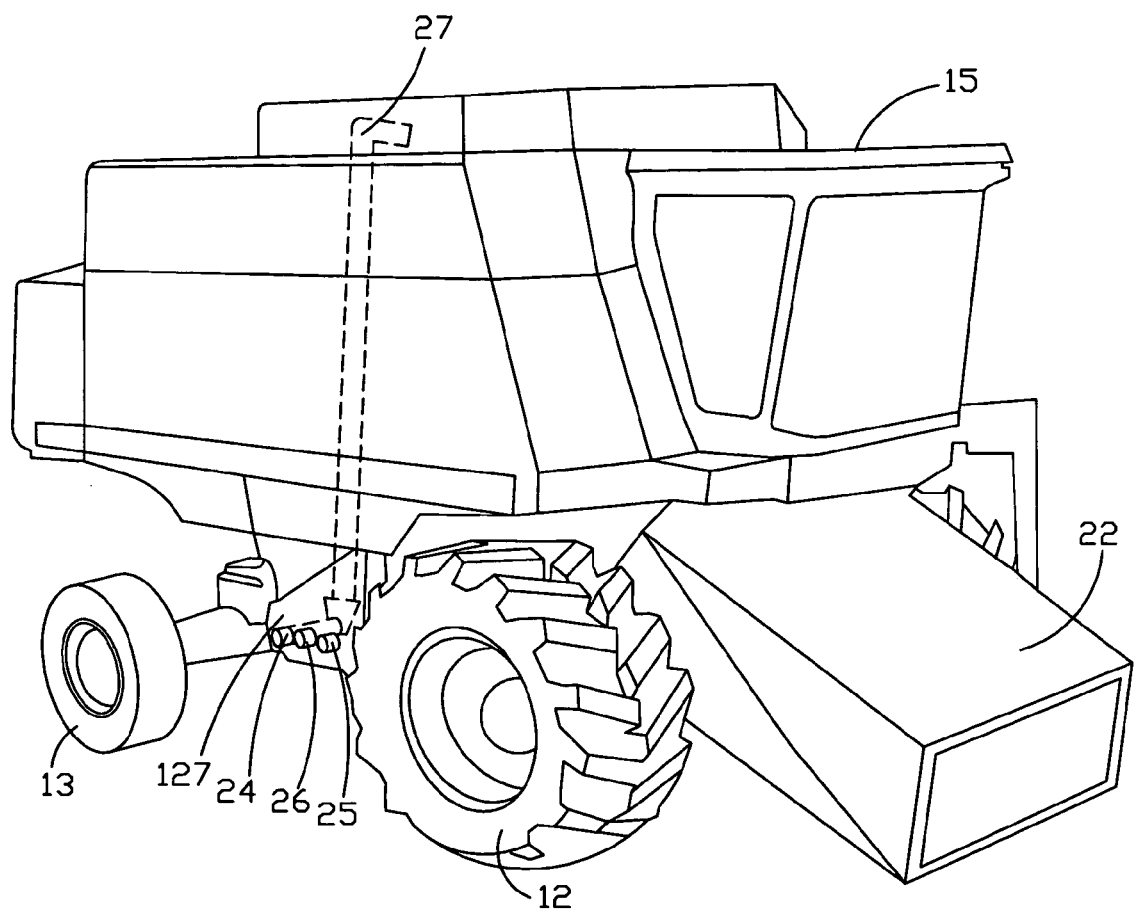
FIG. 2 is a right side view of the opposite side of a harvester of the present invention.
Figure 3:
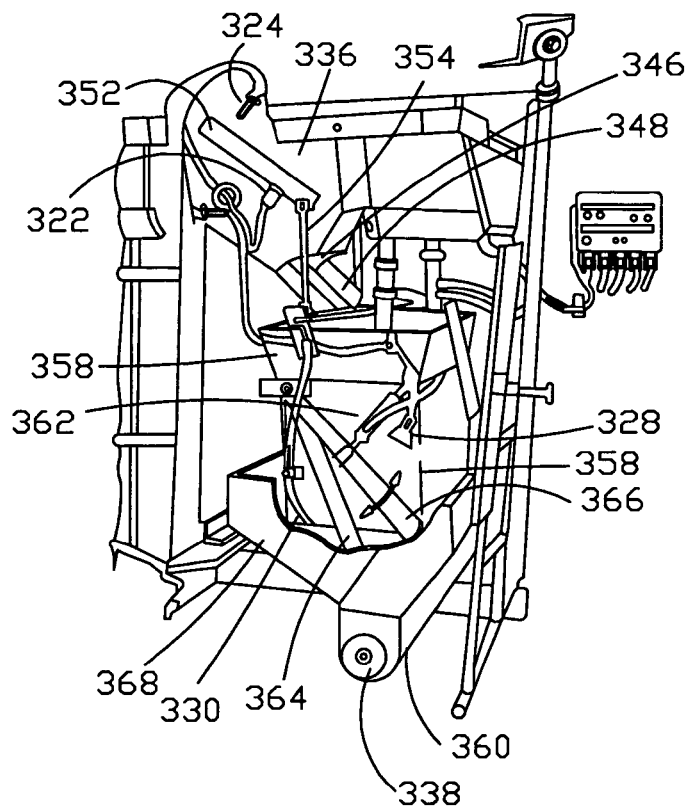
FIG. 3 is a side view of one of the two weigh bucket in a condition for collecting grain.
Figure 4:
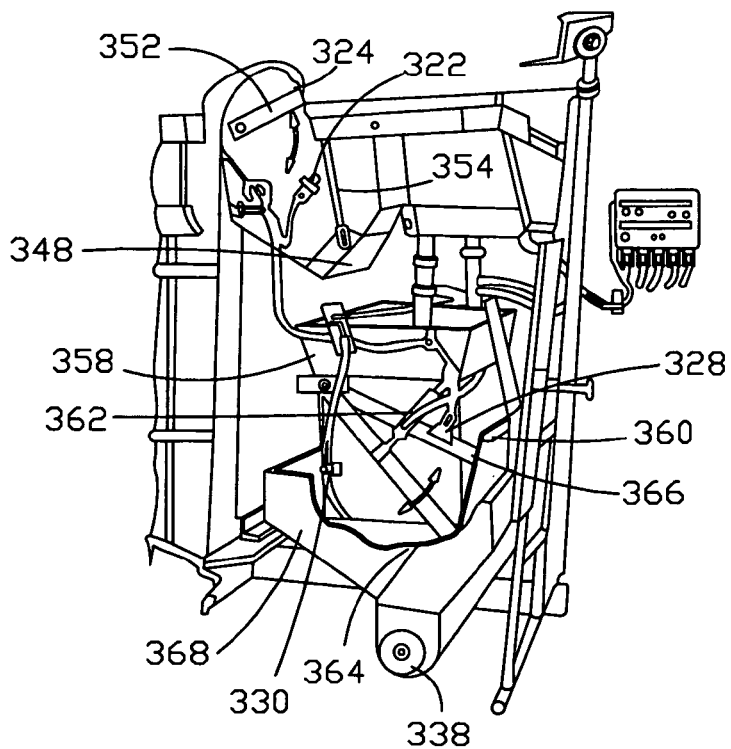
FIG. 4 is a side view of the weigh bucket of FIG. 3 in a condition for discharging grain.
Figure 5:
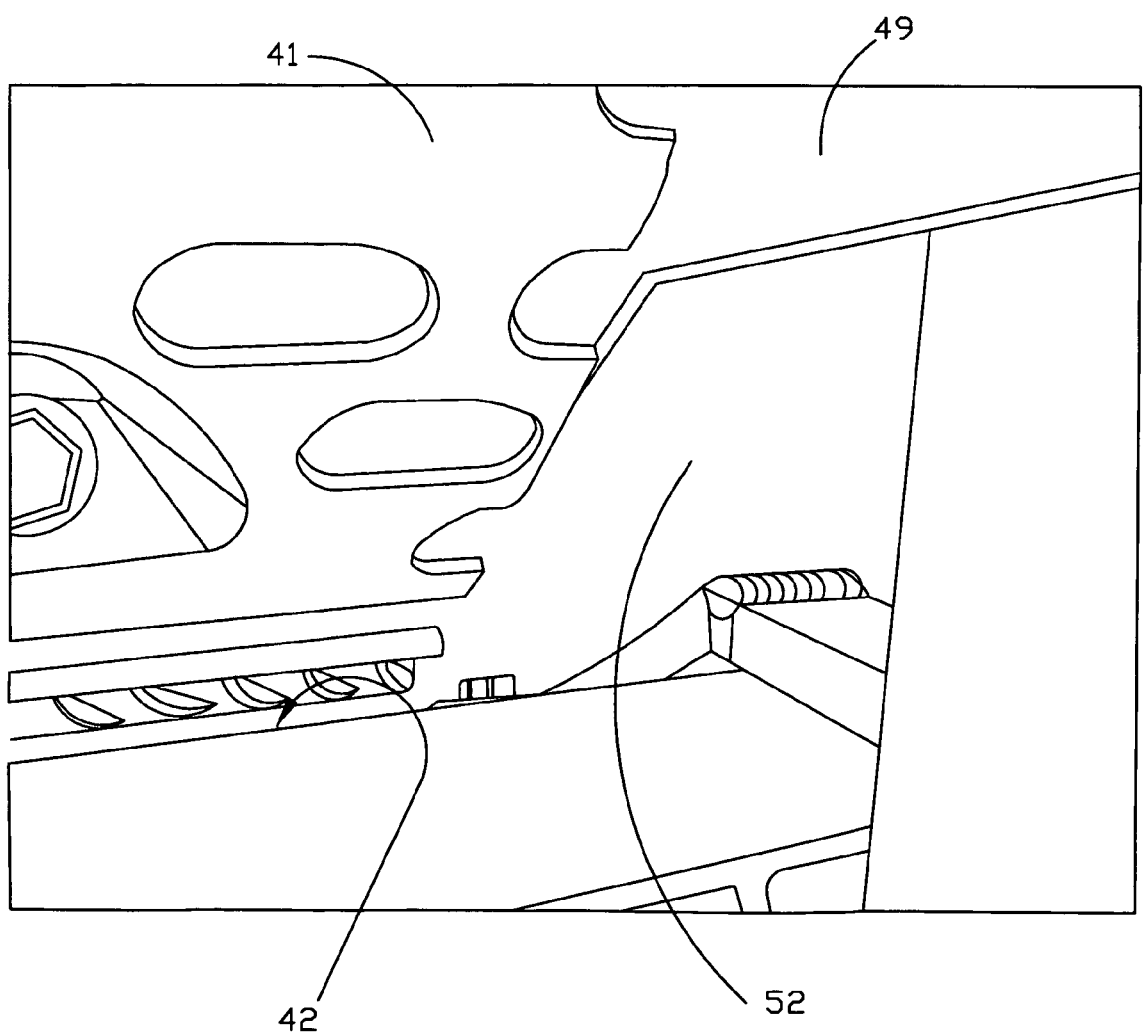
FIG. 5 is a perspective view of the threshing cylinder which lies directly above the concave divider plate that is mateabley engaged with the rotor plate divider.
Figure 6A:
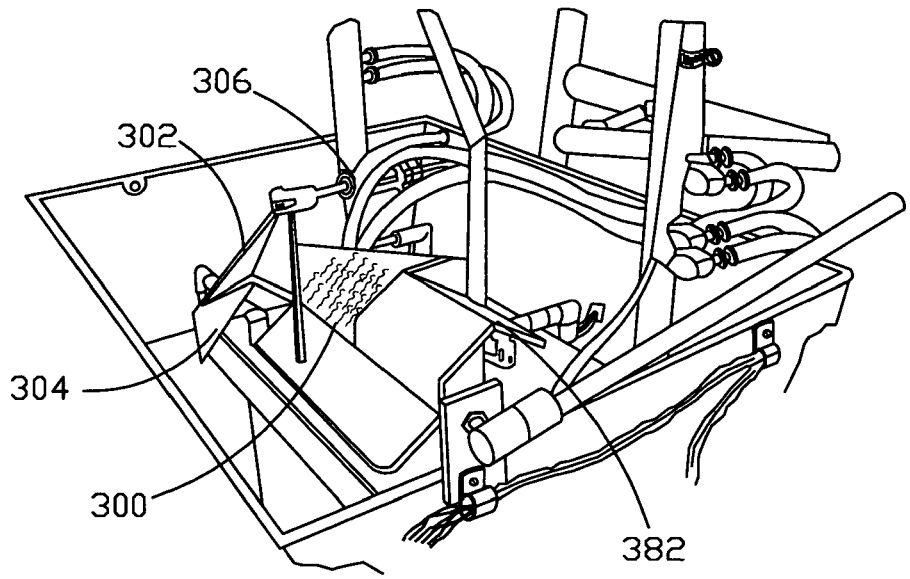
Figure 6B:
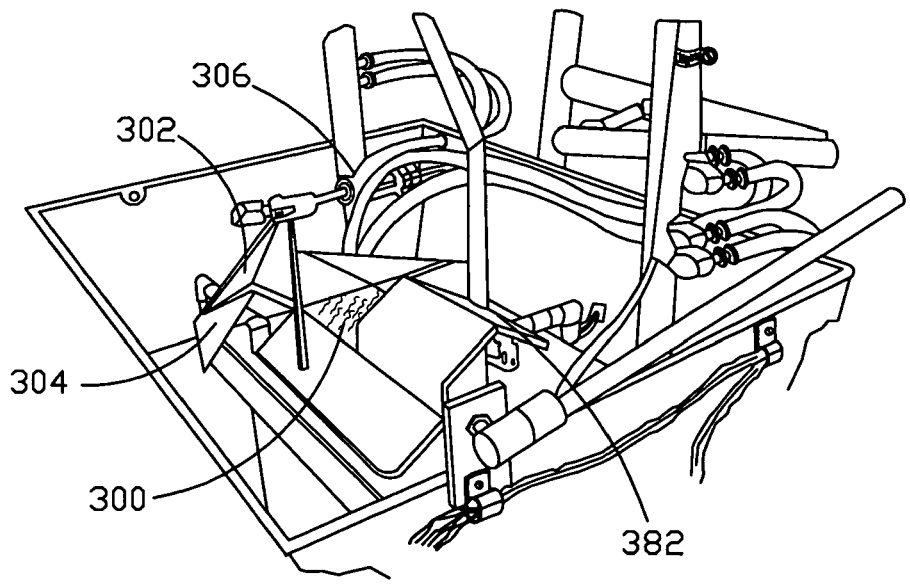
Figure 16:
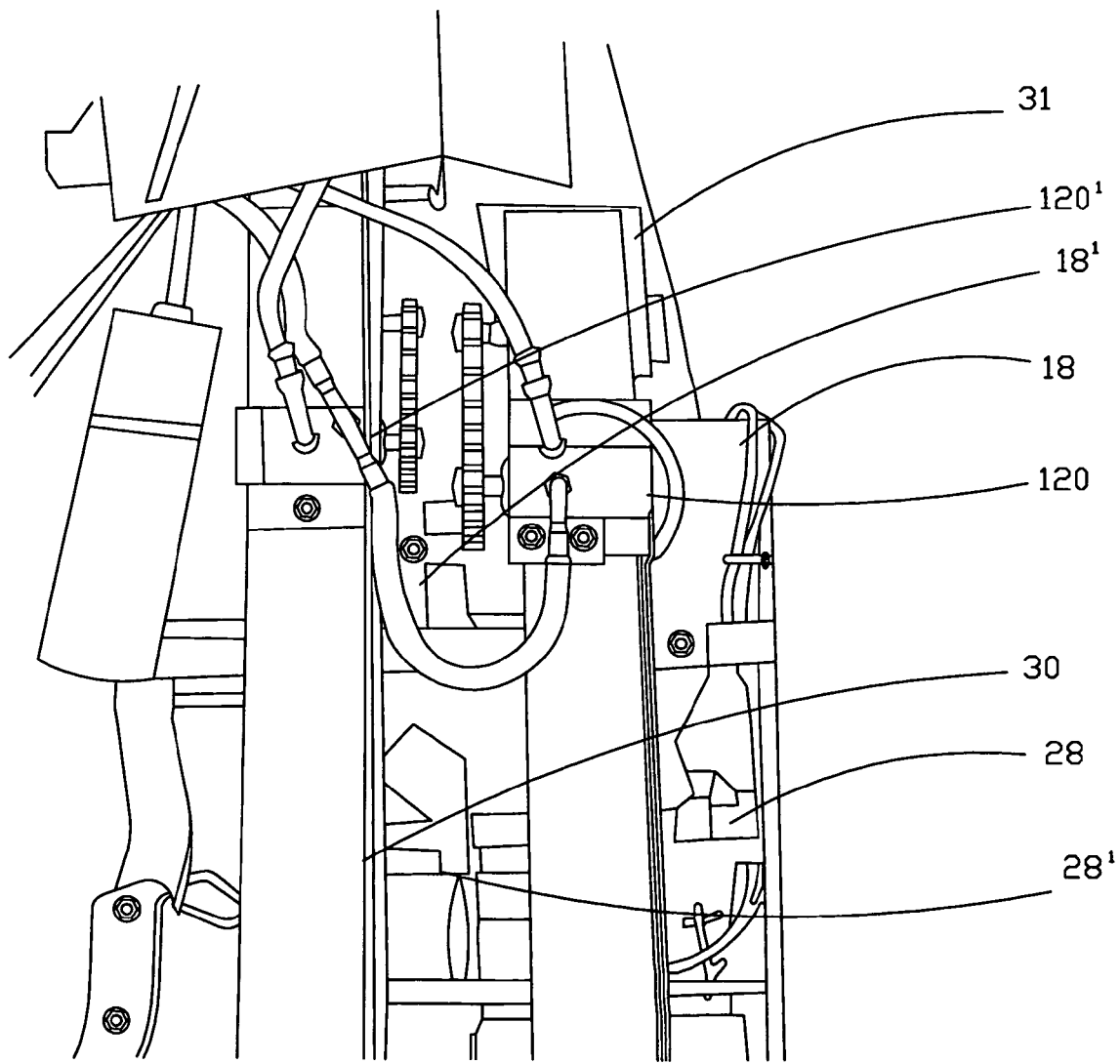
FIG. 16 is a rear view of the two grain bins, the two clean grain short vertical conveyors and the hydraulic motors.

Clean grain falls into its separate clean grain augers shown in FIGS. 1 and 2 as 25 and 26. The auger 26 receiving clean grain from the right compartment 100', shown in FIG. 8, has a full flighting that extends laterally across the bottom of the chassis 11 to convey the clean grain to the left of the harvester (when viewed from rear of harvester). The auger 25 receiving clean grain from the left compartment 100, shown in FIG. 9, it does not need a full flighting and a shaft can be employed under the right compartment 100' and an auger portion under the left compartment 100 so that the grain is conveyed laterally across a portion of the bottom of the chassis 11 to the left side of the harvester to each respective short vertical conveyors 30 and 31 (shown in FIG. 16) each respectively run by hydraulic motors 121, and 121' mounted thereon. These motors 121 and 121' power the vertical elevators conveying the separated clean grain from each respective separate compartment 100, and 100' into a respective right and left holding bins 18 and 18' which are positioned above each respective weigh bucket 28 and 28'. The weigh buckets shown are available from Carter Manufacturing although the teachings of the invention can be applied to other weigh buckets as well.

The weigh buckets shown in the figures are enlarged compared with the buckets that were actually employed. To assure the speed of the weighing procedure both buckets were located proximate one another. To fit within the wheelbase of the harvester the slightly smaller twin buckets offered by Carter Manufacturing were employed. Maintaining the buckets within the wheel base maintains the width of the harvester at the standard production width and avoids any additionally concerns with travel on roads.

Other prior art harvesters have the weigh buckets located proximate the clean grain bin or proximate the right side of the cab above the chassis. Each of these weigh bucket locations increases the run time for taking the weight and moisture data and slows the plot harvesting down.

After weight and similar data is taken according to the teachings in Twilley and by means that are well known in the art, the grain is commingled as it is discharged into a second lateral conveyor 24 which transports the grain beneath the harvester to the right side of the harvester where it is moved upwardly by a short conveyor 127 connected into the right vertical conveyor 27 for deposit into the clean grain tank 20.

The left and right holding bins 18 or holding bin 336 as shown and described in more detail in FIGS. 3, 4, 6A and 6B has a bottom discharge opening 346. For ease of description we will discuss one bin. The description applies equally to the other bin. The discharge of grain from the holding bin 336 is regulated by a discharge chute 348 that is attached for pivotal movement at the bottom of the holding bin 336. Opening and closing of the chute 348 is accomplished by a hydraulic cylinder 350 which moves a pivot arm 352, the free end portion of which is interconnected to the discharge chute 348 by an interconnecting rod 354.

Upon discharge from the holding bin 336, the grain is directed by the chute 348 into a weigh bin bucket 358 that is a part of the weigh bin 328. As will be described in more detail below, the grain held in the weigh bin bucket 358 is weighed and its moisture measured. After being weighed and measured, the grain is discharged from the weigh bin bucket 358 through a bottom opening, which is selectively opened and closed by a door 360. The door 360 is mounted for pivotal movement relative to the weigh bin bucket 358 by two pair of linkage arms, the left-hand side pair being illustrated at 364 and 366, respectively, in FIGS. 3 and 4. The door 360 is moved between its opened and closed positions by a hydraulic cylinder 362 that is pivotally connected to mounting arm 364. The door 360 is held in its closed position while the collected grain is being weighed and measured. The door 360 is then moved to its open position (FIG. 4) and the grain is discharged into a hopper 368, which feeds into the second lateral conveyor 338. The second lateral conveyor transports the weighed and measured grain to the right-hand side of the harvester where it is delivered to the right vertical conveyor for delivery to the clean grain tank.

The grain bins 18 are attached to the harvester 10 by the twin bucket structure supplied by the manufacturer Carter manufacturing.

A smaller sample bin 382 is suspended inside the weigh bin bucket 358. The sample bin 382 is suspended from the support inside the weigh bin bucket 358. The sample bin 382 has an open top 300 (FIGS. 6A and 6B) and a bottom discharge opening that is selectively covered by a pivotal door (not shown) that is controlled by hydraulic cylinder 312 in a manner similar to the holding bin 336 and the weigh bin bucket 358. Accordingly, as grain is discharged from the holding bin 336, it will fill the sample bin 382. The sample bin 382 is calibrated to hold a predetermined volume of grain against which the weight measured in the small capacity load cell 3386 is compared. The weigh bin 382 also includes a moisture sensor for determining the moisture content of the grain sample inside the sample bin 382. By positioning the opening 300 of the sample bin 382 in the outflow stream of grain from the holding bin 336, it is assured that the sample bin 382 will be filled to capacity during each cycle. So that an equal volume of grain is always in the sample bin 382, a hydraulically actuated swipe arm 302 is mounted for pivotal movement across the opening 300. The swipe arm 302 includes a pair of pliable wiping members 304 which are in contact with the upper surface of the weigh bin 382 around the periphery of the opening 300 during swiping action of the swipe arm 302. The swiping action is accomplished by a hydraulic cylinder 306 that is pivotally connected to an end portion of the swipe arm 302. Accordingly, extension and retraction of a hydraulic cylinder will result in pivotal movement of the swipe arm 302 from the solid line position shown in FIGS. 6A and 6B to the dotted line position shown in FIG. 6B. The hydraulic is actuated through a complete extension and retraction cycle following the discharge of grain from the holding bin 336 and prior to the weight and moisture measurements being taken of the grain in the sample bin 382.

The four cylinders are connected to a supply of pressurized hydraulic fluid including reservoir and pump. Extension and retraction of cylinder to open and close the discharge chute 348 of the holding bin 336 is controlled by an electronic solenoid valve. Similarly, extension and retraction of a cylinder to pivot the swiper bar 302 is controlled by an electrically actuated solenoid valve. Upper and lower limit switches 322 and 324, respectively, are positioned on the outer side wall of the holding bin 336 in a position so as to be contacted and actuated by the pivot arm 352 corresponding to the closed and opened positions of the discharge chute 348, respectively. Actuation of the limit switches 322 and 324 will result in movement of the electrically actuated solenoid valve 318 from its respective open position to its closed position. Accordingly, the supply of pressurized hydraulic fluid to the cylinder will be interrupted upon contact of the pivot arm 352 with the respective limit switch 322 and 324.

Both hydraulic cylinders 362 and 312 are connected through a single electrically actuated solenoid valve 326 so that the cylinders 362 and 312 act together to either close the bottom of the sample bin 382 and the weigh bin bucket 358 or open both for discharge after the weighing and measuring process is completed. As with the discharge chute 348 of the holding bin 336, pair of limit switches 328 and 330 are positioned on the side of the weigh bin bucket 358 at a position to define the open and closed positions, respectively, of the door 360.

Accordingly, the weigh bin bucket 358 is sized to accommodate the entire volume of collected grain from each strip test plot at a level below the bottom most end point of the sample bin so that the sample bin is free to move about its pivot point even when grain is present in the weigh bin bucket 358.

A complete operational cycle of the harvester 10 through a strip test plot will now be described. With the harvester 10 in operation, the operator will advance the harvester 10 into the strip test plot to harvest the ears of corn from the stalks or alternatively the beans from the plants, at the beginning of the strip test plot. The ground travel of the harvester 10 is stopped when all of the ears of corn or bean material have been harvested off of the strip test plot and before the harvester 10 has entered the next strip test plot. The operator, by listening to the operation of the harvester 10, waits until all of the harvested either beans or ears have been husked, shelled, cleaned, and conveyed to the holding bin 36. Alternatively, a detector light or a small video camera can be mounted on the harvester with a view of the sample bin 382 and a video screen in the operator's cab to allow the operator to monitor visually the transfer of grain from the holding bin to the weigh bin. The operator then actuates the solenoid valve 318 to discharge the clean grain into the sample bin 382 and weigh bin 328, and to move the swiper bar 302 across the top opening 300 of the sample bin 382, to the position shown in broken line in FIG. 6A. The solenoid valve 318 is then reversed to close the discharge chute 348 and to return the swiper bar 302 tack across the top opening 300 of the sample bin 382, to the position shown in solid line in FIGS. 6A and 6B. The harvester 10 is advanced into the succeeding strip test plot. The readings from both load cells are taken as well as the moisture measurement of the grain sample in the sample bin 382. The solenoid valve 326 is then actuated to open the door of the sample bin 362 and the door 360 of the weigh bin bucket 358. The grain will then be transported through the second lateral conveyor and right vertical conveyor 27 to the clean grain tank 20 where it is commingled with the grain from other strip test plots.

A known microprocessor can be employed to calculate the data received from the sample and or weigh bin. Electronics to complete the data gathering and analysis is well known in the art and specifically taught in Twilley. It is preferred that the sensor and control electronics of the grain measuring apparatus is located near the grain measuring apparatus whereas means for recording collected data is preferable mobile like a computer or hand held device or and if not mobile it is located in the operator's cab.

Although the invention has been described with respect to a preferred embodiment thereof, it is to be also understood that it is not to be so limited since changes and modifications can be made therein which are within the full intended scope of this invention as defined by the appended claims.

We claim:

1. A combine harvester comprising:
    (a) a main frame;
    (b) two compartments each comprising a separate intake, threshing, separating and cleaning assembly mounted to said main frame adapted to extract clean grain portions, each said intake comprising separate, floatably mounted feeder house drums;
    (c) separate conveying means for moving separate clean grain portions;
    (d) weigh buckets positioned for receiving and measuring two separate clean grain portions; and,
    (e) a grain tank for receiving commingled clean grain portions weighed by the weigh buckets.

2. A combine harvester according to claim 1 comprising a rotor dividing plate located proximate each of said threshing and separating assembly.

3. A harvester for separately collecting and separately measuring grain harvested simultaneously from more than one individual variety plot, the harvester comprising: a weighing grain side and an opposite side and a fore and an aft, said harvester comprising:
    (a) mounted on a main frame two separate and distinct sections of an intake, threshing, separating and cleaning assemblies, said two sections formed to avoid grain migration from one section to the other section, said intake comprising two separate, floatably mounted feeder house drums;
    (b) two separate and distinct lateral conveyors for separately moving grain cleaned in one of said assemblies to a left side of the harvester as viewed from the rear of the harvester;
    (c) two substantially vertical conveying means for separately conveying said separately cleaned grain from one of each of said lateral conveyors upwardly to a discharge;
    (d) a divided clean grain bin, wherein each clean grain bin separately receives said separately cleaned grain from one of said lateral conveyors' discharge such that; and, wherein
    (e) at least one physical characteristic of a sample of said cleaned grain is separately measured prior to conveying commingled grain to a clean grain tank.

4. A harvester for collecting crop material and grain from at least two plots, simultaneously, which discards the crop material which is substantially debris and separately measures the grain, from each plot, said harvester comprising:
    (a) a harvester main frame comprising a weighing grain side, an opposite side and a fore and aft;
    (b) a clean grain tank supported on said said frame;
    (c) a first and second divided compartments, supported on said harvester frame, said first and second divided compartments, form a separate right and left grain path adapted to handle the grain from said plots separately in the respective right and left grain path, said crop material and grain moving along said respective right and left grain path from fore to aft of the harvester through the intake, wherein said intake has separate floatably mounted feeder house drums, and through threshing, separating and cleaning assemblies, to separate debris in each respective right and left grain path from the grain without commingling the grain of one plot with the grain of the other plot wherein resultant grain is first and second cleaned grain from one of each right and left grain path; and
    (d) a first and second grain conveyor adapted to respectively move said first and second cleaned grain laterally, without commingling of the first and second cleaned grain, for discharge into a first and second divided clean grain bin for discarding into a weigh bucket wherein each respective first and second cleaned grain from each plot has a physical characteristic measured, and then said measured first and second clean grain is commingled when discarded forming discarded measured clean grain, and a discard conveyor for conveying the discarded measured clean grain to the opposite side of the harvester for discard within the clean grain tank.

5. A harvester as defined in claim 4, wherein said first and second grain conveyor conveys the first and second cleaned grain to the weighing grain side of the harvester.

6. A harvester as defined in claim 5, wherein said discard conveyor for conveying discarded measured clean grain to the clean grain tank includes a lateral discard conveyor for moving the discarded measured clean grain to the opposite side of the harvester and a further conveyor for upward conveying the discarded measured clean grain upwardly from said lateral discard conveyor into the clean grain tank.

7. A combine harvester according to claim 4 comprising a rotor dividing plate located proximate each of said threshing and separating assembly.

8. A harvester for collecting and measuring noncommingled grain from two respective plots, the harvester comprising a first side of the harvester, a weighing grain side and a fore and an aft and a second, opposite side of the harvester, the harvester comprising:
    (a) divided compartments for intake, threshing, separating, and cleaning assemblies and a divided lateral conveyor forming a divided grain flow pathway for conveying noncommingled grain to a first side of the harvester, which is on the left side of the harvester when viewed from the aft, wherein there are two separate grain flow pathways within the harvester, said intake associated with separate floatably mounted feeder house drums for each separate grain flow pathway; and
    (b) a weigh bucket positioned generally below a divided clean grain bin and on said weighing grain side opposite said second, opposite side of the harvester.

9. A combine harvester according to claim 8 comprising a rotor dividing plate located proximate each of said threshing and separating assembly.

* * * * *